Patented Aug. 15, 1939

2,169,971

UNITED STATES PATENT OFFICE 2,169,971

SULPHONIC ACID AMIDE COMPOUNDS

Robert Behnisch, Josef Klarer, and Fritz Mietzsch, Wuppertal-Elberfeld, Germany, assignors to Winthrop Chemical Company, Inc., New York, N. Y., a corporation of New York No Drawing. Application April 15, 1937, Serial No. 137,022. In Germany April 18, 1936

9 Claims. (Cl. 260—401)

This invention relates to new sulphonic acid amide compounds.

It is known that the para-aminobenzenesulphonic acid amide is efficacious in the streptococci infection of the mouse. The efficacy is reduced to a fraction of its original value if the aromatic amino group is substituted by simple acyl radicals, for instance formyl or acetyl.

In accordance with the present invention it has been established that the influence restraining the efficacy is surprisingly restricted to the lowest members of the fatty acid series and that highly efficacious compounds are obtained by introducing into the aromatic amino group of benzene sulphonic acid amides which either contain a sulphonic acid amide group in para-position to the amino group attached to the nucleus or several sulphonic acid amide groups in the nucleus, acid radicals with 5 or more carbon atoms. The acyl radicals may be saturated, or may contain double or triple bonds. The benzene ring may contain further substituents, for instance, alkyl or alkoxy groups, halogen atoms and the like; the hydrogen atoms of the sulphonic acid amide group or groups may be substituted wholly or partially by unsubstituted alkyl, such as methyl, ethyl, alkyl, or aralkyl, such as benzyl and phenylethyl, or cycloalkyl radicals, such as cyclopentyl, cyclohexyl and cyclohexenyl radicals, or two hydrogen atoms may be substituted simultaneously by an alkylene radical (with the formation of a heterocyclic ring, for instance a pyrrolidine or piperidine ring). Compounds of the said kind appear to be equivalent to the simple para-aminobenzene sulphonic acid amide when tested on a mouse, but for their practical use it is most important that they surpass the para-aminobenzene sulphonic acid amide considerably in the streptococci infection of higher warm blooded individuals.

The compounds of the kind specified are obtained by reacting upon an aromatic amino group of benzene sulphonic acid amides of the kind mentioned above and which either contain a sulphonic acid amide group in para-position to the amino group attached to the nucleus or several sulphonic acid amide groups in the nucleus and which may also contain further substituents in the nucleus, with customary acylation agents of 5 or more carbon atoms, as, for instance, acid halides, esters, anhydrides or azides.

It is also possible to start with acylamino benzene compounds the acyl group of which contains at least 5 carbon atoms and which contain a substituent capable of being transformed into the sulphonic acid amide group, for instance sulphonic acid ester or halide groups in para-position to the acylamino group, or several such substituents in the nucleus, and to transform the latter substituents by the action of ammonia or primary or secondary amines into sulphonamide groups.

The invention is further illustrated by the following examples without being restricted thereto:

*Example 1.*—17.2 grams of 4-aminobenzene sulphonic acid amide are heated with 30 grams of oleic acid methyl ester for 3 hours to 140–150° C. The cooled melt is mixed with water, the precipitate is filtered with suction, washed with water and recrystallized from methanol. The 4-oleyl-amido-benzene-sulphonic acid amide is obtained in coarse colorless crystals melting at 197° C.

*Example 2.*—17.2 grams of 4-aminobenzene sulphonic acid amide are dissolved in 50 ccs. of pyridine and 14 grams of caproic acid chloride are added. After 2 hours heating on the water bath the mixture is poured into water, the precipitate is filtered with suction and washed with 5% hydrochloric acid and water. By recrystallizing from methanol the 4-caproylamido-benzene-sulphonic acid amide is obtained in colorless leaflets melting at 201° C.

In an analogous manner there are obtained the 4-caprylic acid amido-benzene sulphonic acid amide melting at 189° C. when using caprylic acide chloride; the 4-capric acid amido-benzene sulphonic acid amide melting at 198° C. when using capric acid chloride; the 4-lauroylamido-benzene sulphonic acid amide melting at 198° C. when using lauric acid anhydride; the 4-myristyl-amido-benzene sulphonic acid amide melting at 203° C. when using myristic acid bromide; the 4-palmitylamido-benzene sulphonic acid amide melting at 202° C. when using palmitic acid chloride; the 4-stearoylamido-benzene sulphonic acid amide melting at 201° C. when using stearic acid chloride; the 4-undecylenoylamino-benzene sulphonic acid amide melting at 199° C. when using undecylenic acid chloride; the 4-erucic acid amido-benzene sulphonic acid amide melting at 177° C. when using erucic acid chloride; the 4-behenoylamido-benzene sulphonic acid amide melting at 171° C. when using behenolic acid chloride; the 4-phenylacetylamido-benzene sulphonic acid amide melting at 201° C. when using phenyl acetic acid chloride.

In an analogous manner there are obtained by reaction of aminobenzene-3.5-di(sulphonic acid dimethylamide) with lauric acid chloride the lauroylamido-benzene-3.5-di(sulphonic acid dimethylamide) melting at 96° C.; the 4-lauroyl-amido-benzene sulphonic acid benzylamide melting at 134° C. when reacting 4-aminobenzene sulphonic acid benzyl amide with lauric acid chloride; the 4-lauroylamido-benzene sulphonic acid butyl amide melting at 113° C. when reacting 4-aminobenzene sulphonic acid butylamide with lauric acid chloride; the 4-lauroylamido-benzene sulphonic acid piperidide melting at 103° C. when reacting 4-aminobenzene sulphonic acid piperidide with lauric acid chloride.

Example 3.—20.8 grams of the hydrochloride of 4-aminobenzene sulphonic acid amide are dissolved in 200 ccs. of water and 15 grams of valeric acid chloride are gradually added at 25–30° C. while stirring. The acid which is set free is weakened by the addition of solid sodium acetate. When a test portion of the reaction mixture acidified with hydrochloric acid do not react with sodium nitrite, the solution is filtered with suction, the precipitate is washed with water and recrystallized from alcohol. The new compound is obtained in the form of colorless, bright leaflets melting at 214° C.

In an analogous manner the 4-cinnamic acid amido benzene sulphonic acid amide melting at 265° C. is obtained from 4-aminobenzene sulphonic acid amide with cinnamic acid azide; the 4-cinnamic acid amido-benzene sulphonic acid diethylamide melting at 157° C. from 4-aminobenzene sulphonic acid diethylamide with cinnamic acid azide.

Example 4.—13 grams of 4-amino-3.6-dimethoxy-benzene sulphonic acid amide are dissolved in 50 ccs. of pyridine and 17 grams of oleic acid chloride are added. The mixture is heated for 4 hours to 100° C. After cooling it is introduced into ice and excess hydrochloric acid, the precipitate is filtered with suction, washed with water and recrystallized from methanol. The 4-oleylamido-3.6-dimethoxy-benzene sulphonic acid amide forms colorless crystals melting at 145° C.

In an analogous manner there are obtained the 4-oleylamido-3.6-dimethyl-benzene sulphonic acid amide melting at 207° C. from oleic acid chloride with 4-amino-3.6-dimethyl-benzene-sulphonic acid amide; the 4-oleylamido-3-methyl-benzene-sulphonic acid amide melting at 138–140° C. with 4-amino-3-methyl-benzene sulphonic acid amide; the 4-oleylamido-2-methyl-benzene sulphonic acid amide melting at 150° C. with 4-amino-2-methyl-benzene sulphonic acid amide; the 4-oleylamido-3-methoxy-6-methyl-benzene sulphonic acid amide melting at 148° C. with 4-amino-3-methoxy-6-methyl-benzene sulphonic acid amide; the 4-isovaleroylamido-3-methoxy-6-methyl-benzene sulphonic acid amide melting at 187° C. from isovaleric acid chloride with 4-amino-3-methoxy-6-methyl-benzene sulphonic acid amide; the 2-methyl-4-oleylamido-5-chlorobenzene sulphonamide with 2-methyl-4-amino-5-chloro-benzene sulphonamide.

Example 5.—7 grams of isovaleroylamino-benzene sulphonic acid (obtained by the action of isovaleric acid chloride upon 4-aminobenzene sulphonic acid) are heated with 6 grams of phosphorus pentachloride and 5 ccs. of benzene on the water bath until the hydrochloric acid evolution has ceased. The mixture is taken up in chloroform and ice, the chloroform is separated, dried with sodium sulphate and treated with methylalcoholic ammonia. After evaporation of the solvents the residue is extracted with 5% hydrochloric acid and the undissolved part recrystallized from methylalcohol. The 4-isovaleroylamido-benzene sulphonic acid amide obtained in this manner melts at 213° C.

When reacting instead of ammonia a methylalcoholic solution of cyclohexylamine upon the solution of the acid chloride, the 4-isovaleroylamido-benzene sulphonic acid cyclohexylamide melting at 197° C. is obtained.

We claim:

1. The compounds of the general formula: R—NH—acyl, wherein R stands for a cyclic radical selected from the group consisting of para-$SO_2NH_2$ and di-$SO_2NH_2$ substituted radicals of the benzene series and of the corresponding radicals which are substituted at the nitrogen atom of the sulphonamide group by unsubstituted alkyl, (4- to 5-membered)-alkylene, mononuclear arylalkyl and mononuclear cycloalkyl radicals, and acyl stands for an acyl radical of at least 5 carbon atoms selected from the group consisting of the radicals of saturated and unsaturated fatty acids and aryl substituted fatty acids.

2. The compounds of the general formula: R—NH—acyl, wherein R stands for a para-$SO_2NH_2$ substituted radical of the benzene series and acyl stands for an acyl radical of at least 5 carbon atoms selected from the group consisting of the radicals of saturated and unsaturated fatty acids and aryl substituted fatty acids.

3. The compounds of the general formula: R—NH—acyl, wherein R stands for a para-$SO_2NH_2$ substituted radical of the benzene series and acyl stands for the radical of a fatty acid of at least 5 carbon atoms.

4. The compounds of the general formula: R—NH—oleyl, wherein R stands for a para-$SO_2NH_2$ substituted radical of the benzene series.

5. The compounds of the general formula:

wherein acyl stands for an acyl radical of at least 5 carbon atoms selected from the group consisting of the radicals of saturated and unsaturated fatty acids and aryl substituted fatty acids.

6. The compounds of the general formula:

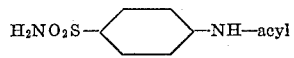

wherein acyl stands for the radical of a fatty acid of at least 5 carbon atoms.

7. The compound of the formula:

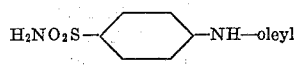

which forms crystals melting at 197° C.

8. The compound of the formula:

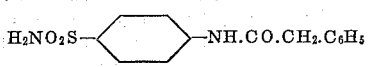

melting at 201° C.

9. 4-isovaleroylaminobenzene sulphonic acid amide melting at 213° C.

ROBERT BEHNISCH.
JOSEF KLARER.
FRITZ MIETZSCH.